(12) United States Patent
Duncan et al.

(10) Patent No.: US 7,362,507 B2
(45) Date of Patent: Apr. 22, 2008

(54) POLARIZING BEAM SPLITTER

(75) Inventors: John E. Duncan, Amelia, OH (US); Michael W. O'Keefe, Cincinnati, OH (US); William E. Phillips, Cincinnati, OH (US); Jiaying Ma, Maplewood, MN (US); Patrick R. Destain, Loveland, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 4 days.

(21) Appl. No.: 11/192,655

(22) Filed: Jul. 29, 2005

(65) Prior Publication Data

US 2007/0024981 A1    Feb. 1, 2007

(51) Int. Cl.
G02B 27/14   (2006.01)
G02B 5/30    (2006.01)

(52) U.S. Cl. .................. 359/637; 359/634; 359/495

(58) Field of Classification Search .............. 359/634, 359/495–500, 486, 831, 637; 353/20, 31, 353/33, 81
See application file for complete search history.

(56) References Cited

U.S. PATENT DOCUMENTS

| | | | |
|---|---|---|---|
| 4,342,863 A | 8/1982 | Hohokabe et al. | 528/360 |
| 4,406,520 A | 9/1983 | Sato | 359/487 |
| 4,627,688 A * | 12/1986 | Kobayashi et al. | 359/634 |
| 5,381,278 A | 1/1995 | Shingaki et al. | 359/256 |
| 5,530,586 A | 6/1996 | Yasugaki | 359/364 |
| 5,579,138 A | 11/1996 | Sannohe et al. | 349/96 |
| 5,771,124 A | 6/1998 | Kintz et al. | 359/633 |
| 5,882,774 A | 3/1999 | Jonza et al. | 428/212 |
| 5,962,114 A | 10/1999 | Jonza et al. | 428/212 |
| 5,991,103 A | 11/1999 | Togino | 359/834 |
| 6,023,373 A | 2/2000 | Inoguchi | 359/633 |
| 6,171,421 B1 | 1/2001 | Murata et al. | 156/99 |
| 6,331,916 B1 | 12/2001 | Mukawa | 359/630 |
| 6,335,838 B1 | 1/2002 | Kasai et al. | 359/834 |
| 6,396,631 B1 | 5/2002 | Ouderkirk | 359/500 |
| 6,426,837 B1 | 7/2002 | Clark et al. | 359/485 |
| 6,486,997 B1 * | 11/2002 | Bruzzone et al. | 359/247 |
| 6,592,224 B2 | 7/2003 | Ito et al. | 353/20 |
| 6,609,795 B2 | 8/2003 | Weber et al. | 353/20 |
| 6,672,721 B2 | 1/2004 | Aastuen et al. | 353/31 |

(Continued)

FOREIGN PATENT DOCUMENTS

CH    260 901    4/1949

(Continued)

OTHER PUBLICATIONS

Stephen Eckhardt et al., "3M PBS for High Performance LCOS Optical Engine".

(Continued)

*Primary Examiner*—M. Hasan
(74) *Attorney, Agent, or Firm*—Robert V. Heiti

(57) ABSTRACT

A polarizing beam splitter is disclosed that includes a first prism, a second prism, and a reflective polarizing film disposed between the first prism and the second prism. The first prism comprises a first polymeric material, and has a first outer curved surface and an additional outer surface. The second prism comprises a second polymeric material, which in some embodiments may be the same as the first polymeric material, and has a second outer curved surface.

16 Claims, 8 Drawing Sheets

U.S. PATENT DOCUMENTS

| | | |
|---|---|---|
| 6,719,426 B2 | 4/2004 | Magarill et al. ............... 353/20 |
| 6,778,228 B2 | 8/2004 | Murakami et al. ............. 349/5 |
| 6,786,604 B2 * | 9/2004 | Aastuen et al. ............... 353/20 |
| 2001/0022689 A1 | 9/2001 | Takeyama ................... 359/625 |
| 2003/0133060 A1 | 7/2003 | Shimada ..................... 349/139 |
| 2003/0184864 A1 | 10/2003 | Bruzzone et al. ........... 359/495 |
| 2004/0233393 A1 | 11/2004 | Magarill et al. ............... 353/33 |
| 2005/0001983 A1 | 1/2005 | Weber et al. ................. 353/20 |
| 2005/0012996 A1 | 1/2005 | Miyazawa et al. .......... 359/486 |
| 2005/0083586 A1 | 4/2005 | Komiya et al. ............. 359/737 |
| 2006/0139730 A1 | 6/2006 | Oehler et al. ................ 359/291 |

FOREIGN PATENT DOCUMENTS

| | | |
|---|---|---|
| EP | 0 398 431 | 11/1990 |
| EP | 0 901 023 | 3/1999 |
| EP | 0 947 869 | 10/1999 |
| GB | 2 413 858 | 11/2005 |
| JP | HEI 5-142499 | 6/1993 |
| JP | 05 257001 | 10/1993 |
| JP | 2000-314809 | 11/2000 |
| JP | 2002-55231 | 2/2002 |
| JP | 2003-75614 | 3/2003 |
| JP | 2003-240926 | 8/2003 |
| WO | 02/063373 | 8/2002 |
| WO | 02/097515 | 12/2002 |

OTHER PUBLICATIONS

Charles L. Bruzzone et al., "10.4 High-Performance LcoS Optical Engine Using Cartesian Polarizer Technology", *SID 03 Digest*.

Charles L. Bruzzone et al., "6.1: Photostability of Polymeric Cartesian Polarizing Beam Splitters", *SID 04 Digest*.

* cited by examiner

POLARIZING BEAM SPLITTER

BACKGROUND OF THE INVENTION

The present disclosure relates to polarization separation devices, which may be used in image display systems. In particular, the present disclosure relates to reflective and transmissive polarizing beam splitters (PBSs), which may be used in image display systems that incorporate polarization-rotating, image-forming devices.

Image display systems incorporating PBSs are used to form images on viewing screens, such as projection displays. A typical image display system incorporates an illumination source that is arranged so that light rays from the illumination source reflect off of an image-forming device or imager that contains the desired image to be projected. The system folds the light rays such that the light rays from the illumination source and the light rays of the projected image share the same physical space between a PBS and the imager.

The imager of the image display system is typically a polarization-rotating, image-forming device, such as a liquid crystal on silicon (LCoS) device, which operates by rotating the polarization of the light rays. LCoS imagers are polarization rotating, which means that polarized light rays are either transmitted with their polarizations substantially unmodified for the darkest state or transmitted with their polarizations rotated to provide a desired gray scale. Thus, an input beam comprising polarized light rays is generally used for illuminating an LCoS imager.

BRIEF SUMMARY OF THE INVENTION

The present disclosure relates to a PBS that includes a first prism, a second prism, and a reflective polarizing film disposed between the first prism and the second prism. The first prism comprises a first polymeric material, and has a first outer curved surface and an additional outer surface. The first prism is configured to transmit light through at least the first outer curved surface and the additional outer surface. The second prism comprises a second polymeric material, and has a second outer curved surface. In some exemplary embodiments, the first polymeric material is the same as the second polymeric material. The PBS is suitable for folding light rays and may be used in compact image display systems. The present disclosure is further related to an image display system that includes a PBS of the present disclosure.

While the above-identified drawing figures set forth several exemplary embodiments of the disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the disclosure. The figures may not be drawn to scale. Like reference numbers have been used throughout the figures to denote like parts.

DETAILED DESCRIPTION

Figure 1:
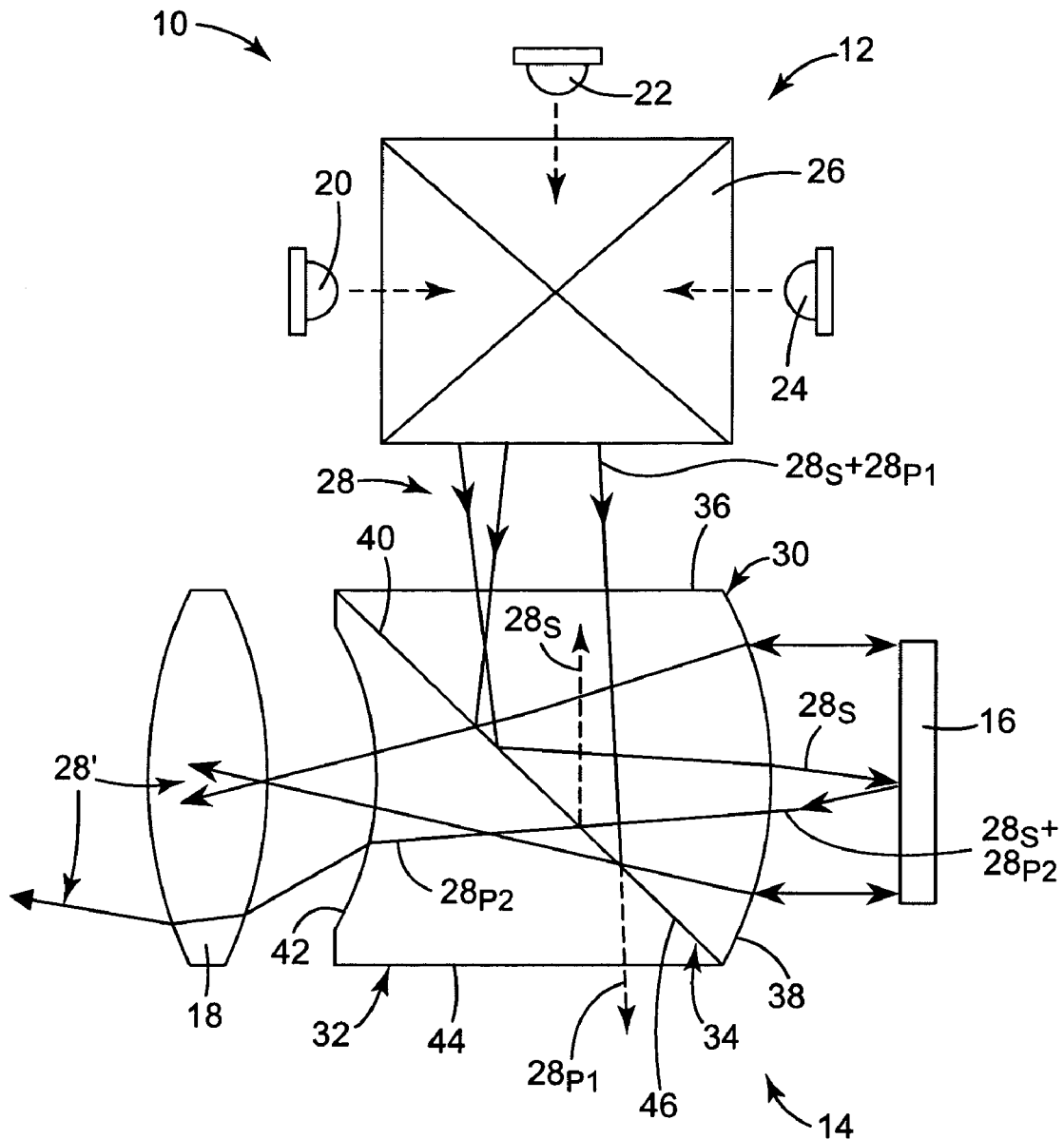
FIG. 1 is a schematic illustration of an image display system, which includes an exemplary reflective PBS of the present disclosure.

Use of a PBS according to the present disclosure offers an attractive design because it can function to both polarize and fold light rays. FIG. 1 is a schematic illustration of an optical system 10, such as an image display system, which may be used in a variety of display devices, such as mini-projection displays, head-mounted displays, virtual viewers, electronic viewfinders, heads-up displays, optical computing, optical correlation, and other optical viewing systems. System 10 includes illumination source 12, PBS 14 of the present disclosure, imager 16, and projection lens 18, which may include one or more optical elements. The exemplary PBS 14 is a reflective PBS capable of reducing the number of imaging optics required to direct light to a viewing screen or a viewer (not shown). This correspondingly allows system 10 to display images in compact devices, such as wireless phones.

Illumination source 12 is exemplified as a three-component light source for providing red, green, and blue or other color components of the projected image. However, one- or two-component light sources may be used as well. Illumination source 12 may include light source of a first color 20, such as one or more red light-emitting diodes (LEDs), light source of a second color 22, such as one or more blue LEDs, light source of a third color 24, such as one or more green LEDs, and color combiner 26. Light sources of the first 20, second 22, and third 24 colors respectively emit first, second, and third wavelength light toward color combiner 26. Illumination source 12 may also include ball lenses (not shown) disposed around each of red LED, green LED, and blue LED for further capturing and directing colored light toward color combiner 26. Color combiner 26 can be an X-cube configuration color combiner or another suitable color combiner that combines the received differently colored light and directs light beam 28 toward PBS 14. Light beam 28 from illumination source 12 contains light of the first, second and third wavelengths, (e.g., red, green, and blue wavelengths) and includes both s-polarized and p-polarized components.

PBS 14 includes a first prism, here, input prism 30, a second prism, here, output prism 32, and reflective polarizing film 34. Input prism 30 and output prism 32 can be low-birefringence, polymeric prisms disposed adjacent each other on opposing sides of reflective polarizing film 34. Input prism 30 includes an outer surface 36, first curved outer surface 38, and incident surface 40. Similarly, output prism 32 includes second curved outer surface 42, outer surface 44, and incident surface 46. As shown in FIG. 1, first curved outer surface 38 is a convex surface and second curved outer surface 42 is a concave surface. Curved outer surfaces 38 and 42 can be generally characterized as refractive surfaces having optical power and function as lenses that are integrated into PBS 14, which redirect the rays of light beam 28 that transmit through them. This reduces the need for additional imaging optics. Those of ordinary skill in the art will readily appreciate that the curvatures and placements of curved outer surfaces 38 and 42 relative to illumination source 12, polarizing film 34, projection lens 18, and the viewing screen or a viewer may be predetermined for directing the rays of light beam 28.

Reflective polarizing film 34 can be a polymeric reflective polarizing film that is secured between incident surfaces 40 and 46 of input prism 30 and output prism 32, respectively. Polarizing film 34 splits light beam 28 received from illumination source 12 into reflected polarization components (s-polarized light rays) and transmitted polarization components (p-polarized light rays). Examples of reflective polarizing films suitable for use in the embodiments of the present disclosure include birefringent, polymer films, e.g., multi-layer optical films (MOF) manufactured by 3M Corporation, St. Paul, Minn., such as those described in Jonza et al., U.S. Pat. No. 5,882,774; Weber et al., U.S. Pat. No. 6,609,795; and Magarill et al., U.S. Pat. No. 6,719,426, the disclosures of which are hereby incorporated by reference herein.

Suitable reflective polarizing films for reflective polarizing film 34 also include polymeric reflective polarizing films including different polymeric materials, e.g., first and second polymeric materials. For example, reflective polarizing film 34 may include a first layer and a second layer, where the polymeric materials of the first and second layer are different and at least one of the first and second layers being birefringent. In one embodiment of the present disclosure, reflective polarizing film 34 may include a multi-layer stack of first and second alternating layers of different polymer materials, as disclosed in Weber et al., U.S. Pat. No. 6,609, 795. In another embodiment of the present disclosure, multiple reflective polarizing films may be used.

Suitable reflective polarizing films are typically characterized by a large refractive index difference between first and second polymeric materials along a first direction in the plane of the film and a small refractive index difference between first and second polymeric materials along a second direction in the plane of the film, orthogonal to the first direction. In some exemplary embodiments, reflective polarizing films are also characterized by a small refractive index difference between first and second polymeric materials along the thickness direction of the film (e.g., between the first and second layers of different polymeric materials). Examples of suitable refractive index differences between the first and second different polymeric materials in the stretched direction (i.e., x-direction) range from about 0.15 to about 0.20. The refractive indices in the non-stretched directions (i.e., the y-direction and the z-direction) are desirably within about 5% of one another for a given layer, and within about 5% of the corresponding non-stretched directions of an adjacent layer.

The polymeric materials selected for the layers of an exemplary multilayer reflective polarizing film 34 may include materials that exhibit low levels of light absorption. For example, polyethylene terephthalate (PET) exhibits an absorption coefficient of less than $1.0 \times 10^{-5}$ centimeters. Accordingly, for reflective polarizer film 34 that includes PET and has a thickness of about 125 micrometers, the calculated absorption is about 0.000023%, which is about 1/200,000 of an absorption of a comparable wire-grid polarizer.

Low absorptions are desirable because polarizers used in PBSs are exposed to very high light density, which can lead to the failure of the polarizers. For example, absorptive-type polarizer films absorb all the light with unwanted polarization. This generates significant heat. Substrates with high thermal conductivity, such as sapphire, are therefore needed to conduct the heat away from the polarizer films. Moreover, the substrates are exposed to high heat loads, which correspondingly generate thermal birefringence in the substrates. Thermal birefringence in the substrates degrade the contrast and contrast uniformity of the optical system, such as an image display system. As a result, only few materials can be qualified for the substrates with traditional PBSs (e.g., sapphire, quartz, leads content glass, and ceramics).

Similarly, wire-grid polarizers, which use thin metal stripes (e.g., aluminum stripes) coated on transparent substrates, absorb small portions of the received light. This also generates heat in the substrates. For example, 5–10% of the light is absorbed by aluminum stripes in the same manner as an aluminum mirror surface. Since the performance of the wire-grid polarizer is sensitive to the geometric stability of the metal stripes, a small change in the substrates due to thermal expansion can degrade the polarizer's performance.

In contrast, the use of polymeric materials with low absorption coefficients (e.g., PET) allows reflective polarizer film 34 to be used without the need of high-thermal conductivity substrates to conduct heat way from reflective polarizing film 34. As such, reflective polarizer film 34 may be used for extended periods of time with input prism 30 and output prism 32.

Referring further to FIG. 1, imager 16 is a polarization-rotating component, such as an LCoS, which is disposed to receive light from curved outer surface 38 of input prism 30. Imager 16 reflects and rotates the polarization of the rays of light beam 28 based on the whether the pixels of imager 16 are "on" or "off". The individual rays of light beam 28 that contact the "off" pixels of imager 16 reflect off imager 16 with their polarizations unchanged (i.e., retain s-polarization). In contrast, the individual rays of light beam 28 that contact the "on" pixels of imager 16 reflect off imager 16 with their polarizations rotated (i.e., rotated from s-polarization to p-polarization). As a result, imager 16 may rotate the polarization of the individual rays of light beam 28 based on pixel settings, which are controlled to create a desired projected image.

Projection lens 18 can be disposed to receive light from curved outer surface 42 of output prism 32, such that it collects the rays of light beam 28 received from PBS 14 for transmission to a viewing screen or a viewer as output light beam 28'. While only illustrated with a single projection lens, system 10 may include additional imaging optics as needed. However, curved outer surfaces 38 and 42 each function as a lens integrated in PBS 14. This reduces the number of additional imaging optics that may be needed to direct the rays of light beam 28, which correspondingly decreases the required size of system 10.

During use of system 10, illumination source 12 emits light beam 28 toward PBS 14. As discussed above, prior to entering PBS 14, light beam 28 is typically unpolarized and contains both s-polarized light rays (light rays $28_S$) and p-polarized light rays (light rays $28_{P1}$). Light beam 28 enters PBS 14 by passing through outer surface 36, and travels toward polarizing film 34.

Prior to contacting polarizing film 34, light beam 28 passes through incident surface 40 of input prism 30. Polarizing film 34 then reflects light rays $28_S$ toward curved outer surface 38 of input prism 30, and transmits light rays $28_{P1}$ into output prism 32. Light rays $28_{P1}$ enter output prism 32 through incident surface 46 and travel toward base outer surface 42. Light rays $28_{P1}$ then exit output prism 32 through the additional outer surface 44 of output prism 32 and may be discarded or recycled.

Light rays $28_S$ exit PBS 14 by passing through curved outer surface 38. As discussed above, curved outer surface 38 can be a convex refractive surface that has optical power and functions as a lens. Therefore, light rays $28_S$ are redirected when passing through curved outer surface 38. After exiting input prism 30, light rays $28_S$ contact and reflect off imager 16. The individual light rays 28S that contact pixels of imager 16 in the "off" state retain their s-polarization upon reflection. However, the individual light rays $28_S$ that contact pixels of imager 16 in the "on" state have their polarizations rotated from s-polarization to p-polarization upon reflection. As a result, the reflected light beam 28 includes light rays $28_S$ and p-polarized light rays (light rays $28_{P2}$).

Light rays $28_S$ and $28_{P2}$ reflected from imager 16 are directed back toward input prism 30, and re-enter input prism 30 through curved outer surface 38. Curved outer surface 38 redirects light rays $28_S$ and $28_{P2}$ as they travel toward polarizing film 34. Light rays $28_S$ and $28_{P2}$ then pass through incident surface 40 of input prism 30 and contact polarizing film 34. Polarizing film 34 then reflects light rays 28S toward the outer surface 36 of input prism 30, and transmits light rays $28_{P2}$ into output prism 32. Light rays $28_S$ then exit input prism 30 through the outer surface 36 and travel toward illumination source 12. In one embodiment of the present disclosure, light rays $28_S$ that are directed back toward illumination source 12 may be reflected back into input prism 30 to be reused. Because light rays $28_S$ are s-polarized, substantially all of light rays $28_S$ that are reused will be reflected from polarizing film 34 toward imager 16. This conserves power required to operate system 10.

After transmitting through polarizing film 34, light rays $28_{P2}$ enter output prism 44 through incident surface 46. Light rays $28_{P2}$ then exit output prism 32 through curved outer surface 42. Curved outer surface 42, shown as a concave refractive surface in FIG. 1, also functions as a lens and redirects light rays $28_{P2}$ as they travel toward projection lens 18. Projection lens 18 then collects light rays $28_{P2}$ and can direct the output light beam 28' toward the viewing screen with the desired projected image. As discussed above, additional imaging optics may be used to redirect light rays $28_{P2}$, as needed. However, curved outer surfaces 38 and 42 of PBS 14 function as lenses (or, generally, as refractive surfaces having optical power) to reduce the number of additional imaging optics required.

Figure 2:
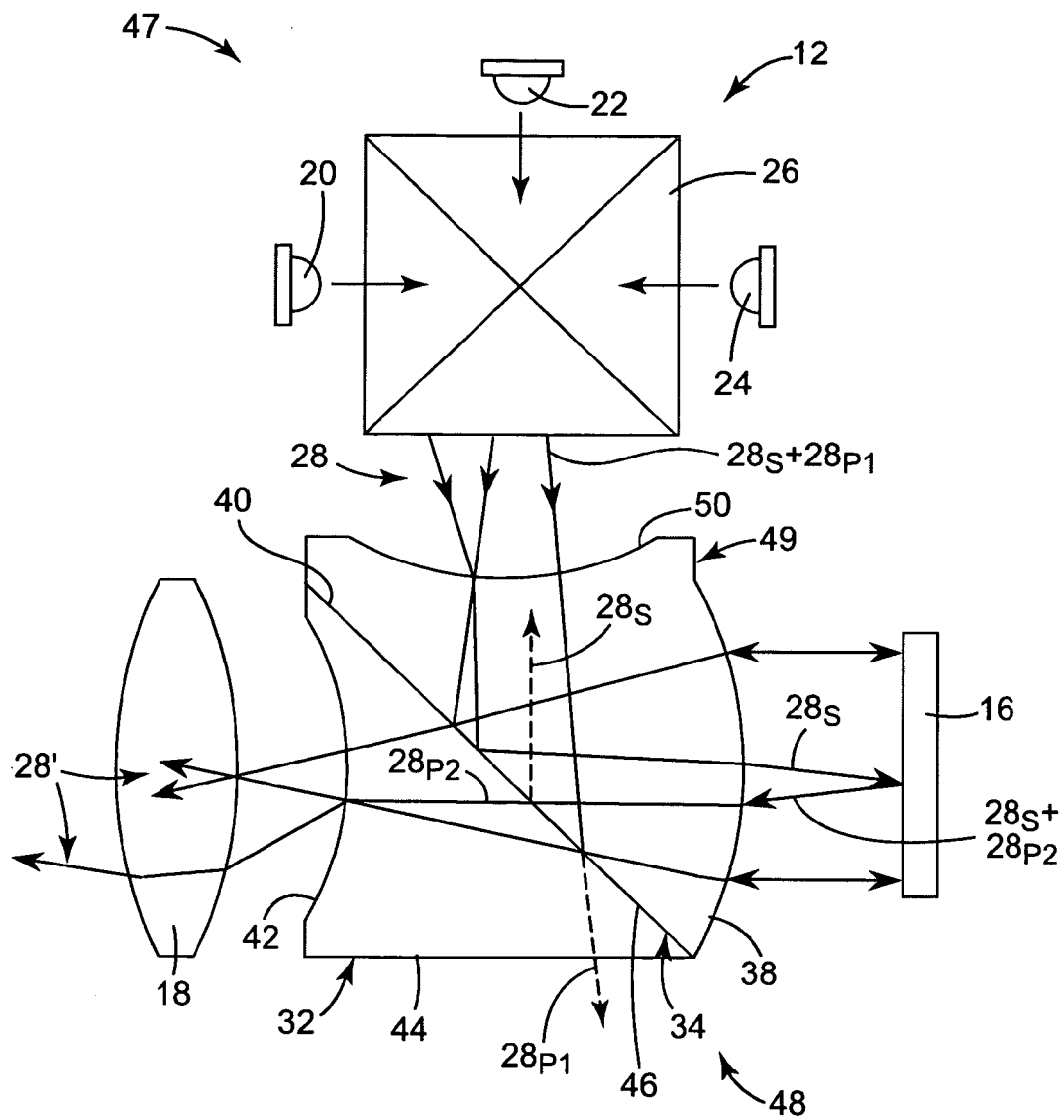
FIG. 2 is a schematic illustration of an image display system, which includes another exemplary embodiment of the reflective PBS of the present disclosure.

FIG. 2 is a schematic illustration of an optical system system 47, which is an image display system similar to system 10, discussed above. System 47 includes illumination source 12, imager 16, projection lens 18, and PBS 48, where PBS 48 interacts with illumination source 12, imager 16, and projection lens 18 in a similar manner to PBS 14 shown in FIG. 1. PBS 48 is a reflective PBS that includes a first prism, here, an input prism 49 having a second curved outer surface 50 in place of (planar) additional outer surface 36 and a second prism, here output prism 32. In that configuration, the outer curved surface 42 may be referred to as a third curved outer surface of output prism 32.

Curved outer surface 50 is also a refractive surface having optical power, exemplified in FIG. 2 as a concave surface that functions as a lens in a similar manner to curved outer surfaces 38 and 42. Accordingly, the second curved outer surface 50 of input prism 49 redirects the rays of light beam 28 that transmit through curved outer surface 50 from illumination source 12. The redirected rays of light beam 28 at curved outer surface 50 correspondingly adjust the directions of the rays of light beam 28 through system 10. This is illustrated by a comparison of the rays of light beam 28 in FIGS. 1 and 2.

The curvatures and placements of curved outer surface 50 relative to illumination source 12 and polarizing film 34 may also be predetermined for redirecting the rays of light beam 28. The use of curved outer surface 50 having optical power provides additional control over the directions of the rays of light beam 28, and may further reduce the number of additional imaging optics, which may be needed to focus light 28, thereby reducing the size of system 47.

Figure 3:
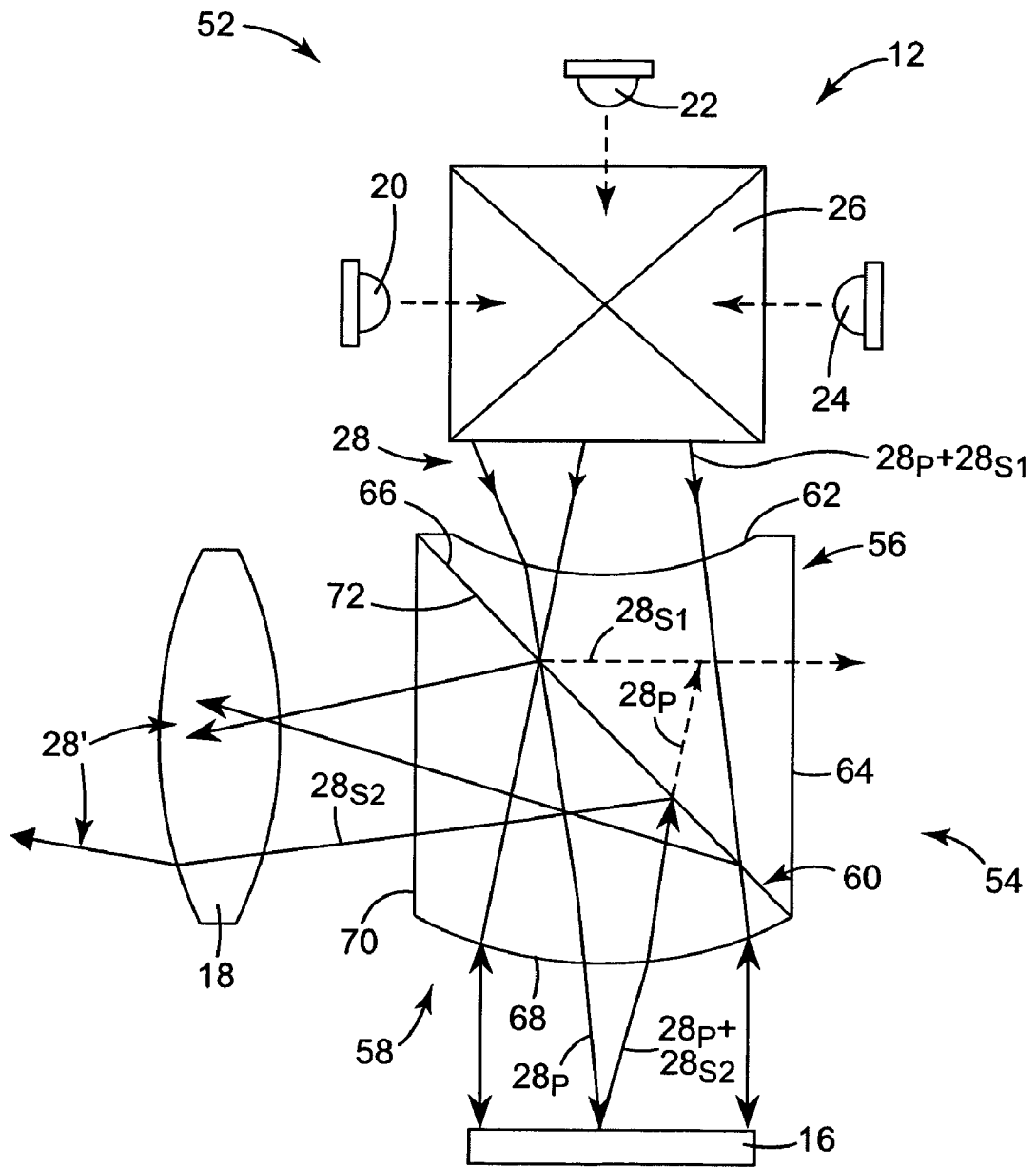
FIG. 3 is a schematic illustration of an image display system, which includes an exemplary transmissive PBS of the present disclosure.

FIG. 3 is a schematic illustration of an optical system 52, which is also an image display system similar to systems 10 and 47, discussed above. System 52 includes illumination source 12, imager 16, projection lens 18, and another exemplary PBS 54 of the present disclosure. PBS 54 of the present disclosure is a transmissive PBS that also is capable of reducing the number of imaging optics required to direct light to a viewing screen (not shown).

PBS 54 includes a first prism, here, output prism 58, a second prism, here, input prism 56, and reflective polarizing film 60. Input prism 56 and output prism 58 can be low-birefringence, polymeric prisms disposed adjacent each other on opposing sides of reflective polarizing film 60. Because the exemplary PBS 54 is a transmissive PBS, the rays of light beam 28 used to form the projected image are shown transmitting through an outer surface 62 of input prism 56 and through two outer surfaces 68, 70 of output prism 58. This is in contrast to the exemplary PBS 14 discussed above in FIG. 1, which is a reflective PBS, and is shown with the rays of light beam 28 used to form the projected image passing through two outer surfaces of input prism 30 and through one outer surface of output prism 32.

Input prism 56 includes a second curved outer surface 62, additional outer surface 64, and incident surface 66. Similarly, output prism 58 includes a first curved outer surface 68, additional outer surface 70, and incident surface 72. As shown in FIG. 3, curved outer surface 62 can be a concave surface and curved outer surface 68 can be a convex surface. Curved outer surfaces 62 and 68 function as lenses (and, generally, as refractive surfaces having optical power) that are integrated into PBS 54, and redirect the rays of light beam 28 that are transmitted through them, thereby reducing the need for additional imaging optics. The curvatures and placements of curved outer surfaces 62 and 68 relative to illumination source 12, polarizing film 60, projection lens 18, and the viewing screen may be predetermined for directing light beam 28 in a desired way.

Reflective polarizing film 60 is a polymeric reflective polarizing film that is secured between incident surfaces 66 and 72 of input prism 56 and output prism 58, respectively. Examples of suitable films for polarizing film 60 include the films discussed above for polarizing film 34. Polarizing film 60 also splits light beam 28 received from illumination source 12 into reflected polarization components (s-polarized light rays) and transmitted polarization components (p-polarized light rays).

During use of system 52, illumination source 12 emits light beam 28 toward PBS 54. Prior to entering PBS 54, light beam 28 is unpolarized and contains both s-polarized light rays (light rays $28_{S1}$) and p-polarized light rays (light rays $28_P$). Light beam 28 enters PBS 54 by passing through curved outer surface 62, which redirects light rays $28_{S1}$ and $28_P$ due to the surface curvature. Light beam 28 then passes through incident surface 66 of input prism 56 and contacts polarizing film 60. Polarizing film 60 then reflects light rays $28_{S1}$ toward additional outer surface 64 of input prism 56, and transmits light rays $28_P$ into output prism 68. Light rays $28_{S1}$ pass back into input prism 56 through incident surface 66 and travel toward additional outer surface 64. Light rays $28_{S1}$ then exit input prism 56 through additional outer surface 64 and may be discarded or recycled.

After transmitting through polarizing film 60, light rays $28_P$ enter output prism 58 through incident surface 72, and travel toward curved outer surface 68. Light rays $28_P$ exit PBS 54 by passing through curved outer surface 68, which redirects light rays $28_P$. After exiting output prism 58, light rays $28_P$ contact and reflect off imager 16. The individual light rays $28_P$ that contact pixels of imager 16 in the "off" state retain their p-polarization upon reflection. However, the individual light rays $28_P$ that contact pixels of imager 16 in the "on" state have their polarizations rotated from p-polarization to s-polarization upon reflection. As a result, the reflected light includes light rays $28_P$ and s-polarized light rays (light rays $28_{S2}$).

Light rays $28_P$ and $28_{S2}$ reflected from imager 16 are directed back toward output prism 58, and re-enter output prism 58 through curved outer surface 68. Curved outer surface 68 redirects light rays $28_P$ and $28_{S2}$ as they travel toward polarizing film 60. Light rays $28_P$ and $28_{S2}$ then pass through incident surface 72 of output prism 58 and contact polarizing film 60. Polarizing film 60 then reflects light rays $28_{S2}$ toward additional outer surface 70 of output prism 58, and transmits light rays $28_P$ into input prism 56.

Light rays $28_P$ pass back into input prism 56 through incident surface 66 and travel toward curved outer surface 62. Light rays $28_P$ then exit input prism 56 through curved outer surface 62 (which again redirects light rays $28_P$) and travel toward illumination source 12. In one embodiment of the present disclosure, light rays $28_P$ that are directed back toward illumination source 12 may be reflected back into input prism 56 to be reused. Because light rays $28_P$ are p-polarized, substantially all of light rays $28_P$ reused will transmit through polarizing film 60 toward imager 16. This conserves power required to operate system 52.

Light rays $28_{S2}$ that reflect off of polarizing film 60 re-enter output prism 58 through incident surface 72 and travel toward additional outer surface 70. Light rays $28_{S2}$ then exit output prism 58 through additional outer surface 70, and travel toward projection lens 18. Projection lens 18 then collects and directs light rays $28_{S2}$ so that output light beam 28' propagates toward a viewing screen or a viewer with the desired projected image. Accordingly, curved outer surfaces 62 and 68 of PBS 54 function as integrated lenses that reduce the number of additional imaging optics required for system 52.

Figure 4:
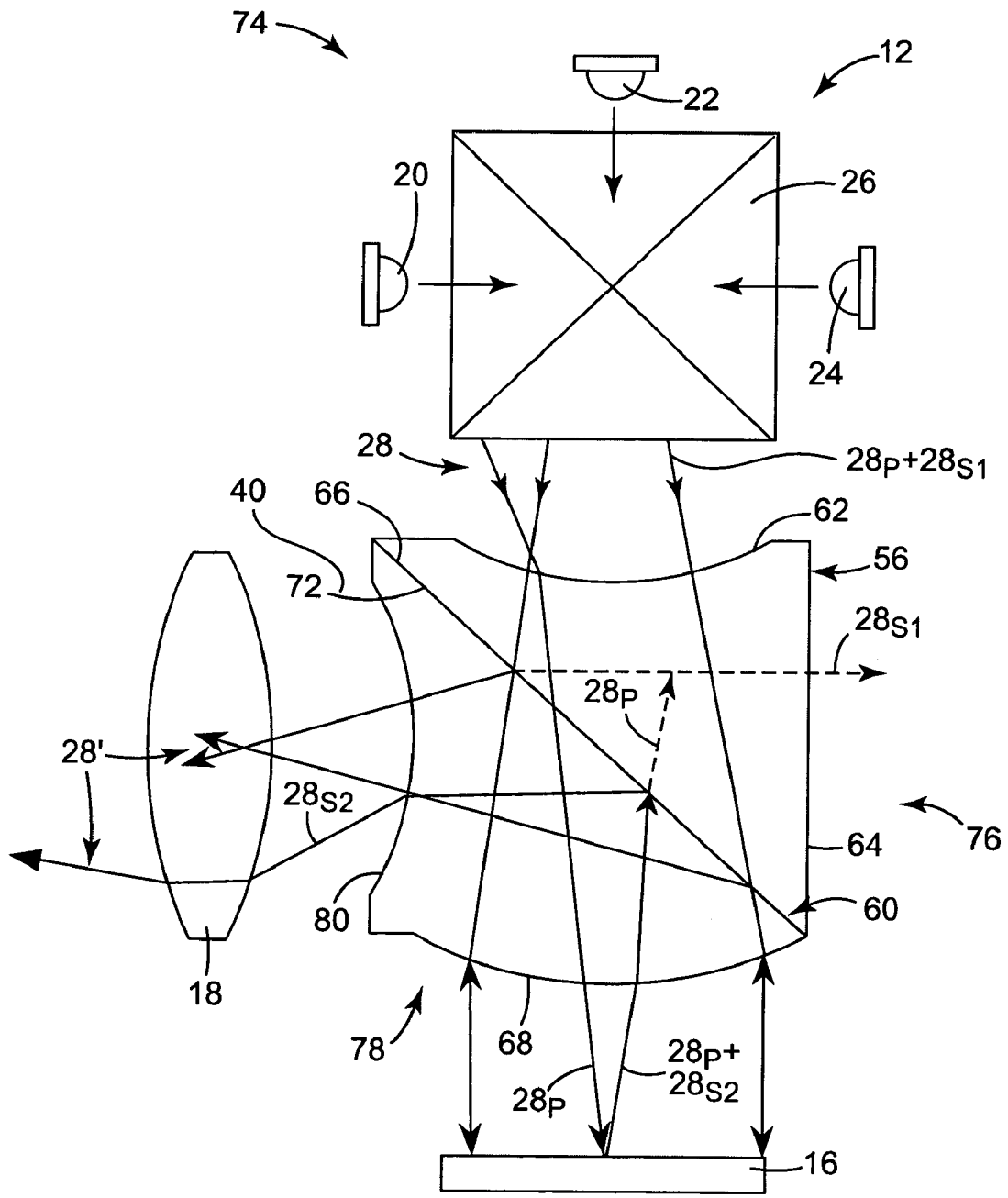
FIG. 4 is a schematic illustration of an image display system, which includes another exemplary embodiment of the transmissive PBS of the present disclosure.

FIG. 4 is a schematic illustration of an optical system 74, which is an image display system similar to system 52, discussed above in connection with FIG. 3. System 74 includes illumination source 12, imager 16, projection lens 18, and PBS 76, where PBS 76 interacts with illumination source 12, imager 16, and projection lens 18 in a manner similar to PBS 54 of system 52. PBS 76 is a transmissive PBS that includes a first prism, here, output prism 78, having a second curved outer surface 80 in place of (planar) additional surface 70 and a first curved outer surface 68. The PBS 76 further includes a second prism, here, the input prism 56. In that configuration, the outer curved surface 62 may be referred to as a third curved outer surface of input prism 56.

Curved outer surface 80 is exemplified as a concave surface that functions as a lens in a similar manner to curved outer surfaces 62 and 68. Accordingly, curved outer surface 80 redirects the light rays $28_{S2}$ that transmit through curved outer surface 80. This redirects where light rays $28_{S2}$ contact projection lens 18, as is illustrated by a comparison of light rays $28_{S2}$ in FIGS. 3 and 4.

The curvatures and placements of curved outer surface 80 relative to projection lens 18 and polarizing film 60 may also be predetermined to accurately redirect light beam 28. The use of curved outer surface 80 provides additional control over the directions of the rays of light beam 28, and may further reduce the number of additional imaging optics required to direct light beam 28, thereby reducing the size of system 74.

While PBSs 14, 48, 54, and 76 discussed above in FIGS. 1–4 are shown with particular curved outer surfaces being either convex or concave, alternative PBSs of the present disclosure may include different combinations of convex and concave curvatures. Additionally, each of the curved outer surfaces of the PBSs of the present disclosure may exhibit curvature across the entire surface (e.g., curved outer surface 38 in FIG. 1) or only along the portions of the surface where light beam 28 transmits through (e.g., curved outer surface 42 in FIG. 1). In some exemplary embodiments of the present disclosure, one or more of the curved surfaces may be spherical or aspherical.

As discussed above, the first and second prisms, such as the input prisms (e.g., input prisms 30, 49, and 56) and the output prisms (e.g., output prisms 32, 58, and 78) of the PBSs of the present disclosure can be each manufactured from polymeric materials. In some exemplary embodiments, the first prism is manufactured from the first polymeric material and the second prism is manufactured from the second polymeric material. The first and second polymeric materials may be the same or different, depending on a particular application. Due to their polymeric nature, the first and second prisms may be readily manufactured in a variety of manners, such as injection molding. After the first prism and the second prism are molded, a reflective polarizing film (e.g., reflective polarizing films 34 and 60) may be adhered or otherwise disposed between the respective incident surfaces of the first prism and the second prism, which also secures the first prism relative to the second prism. Examples of suitable adhesives for the adhesion include ultraviolet-curable optical adhesives. Alternatively, at least one of the prisms may be molded against a reflective polarizing film. Examples of suitable techniques for manufacturing PBSs of the present disclosure are disclosed in the co-pending and commonly-owned application, entitled "Method for Making Polarizing Beam Splitters", and which is incorporated by reference in its entirety.

After manufacturing, the PBSs of the present disclosure may be incorporated into image display systems (e.g., systems 10, 47, 52, and 74). Because the PBSs of the present disclosure fold the rays of light beam 28 and reduce the number of required imaging optics, the image display systems may be compact for use in small imaging devices. Examples of suitable volumetric dimensions of the image display systems include volumes of about 16 cubic centimeters or less. Examples of suitable footprint areas of the image display systems include areas of about 9 square centimeters or less, where the footprint areas are taken in a plane that is parallel to views shown in FIGS. 1–4.

Examples of suitable polymers for the first prisms and the second prisms of the PBSs of the present disclosure include transparent polymers such as acrylic polymers (e.g., polymethylmethacrylates), cyclic-olefin copolymers, polycarbonates, and combinations thereof. Examples of particularly suitable polymers include acrylic polymers commercially available under the trade designation "OPTOREZ OZ-1330" Series polymers from Hitachi Chemical Company, Ltd, Tokyo, Japan.

FIGS. 5A–5D are exploded perspective views of exemplary PBSs 114, 214, 314, and 414, which depict exemplary engagement mechanisms for securing a first prism to a second prism. PBS's 114, 214, 314, and 414 have general configurations similar to the PBS 14, where the respective reference labels are increased by 100, 200, 300, and 400. The embodiments disclosed in FIGS. 5A–5D are also suitable for use with any of the above-mentioned embodiments of the present disclosure.

Figure 5A:
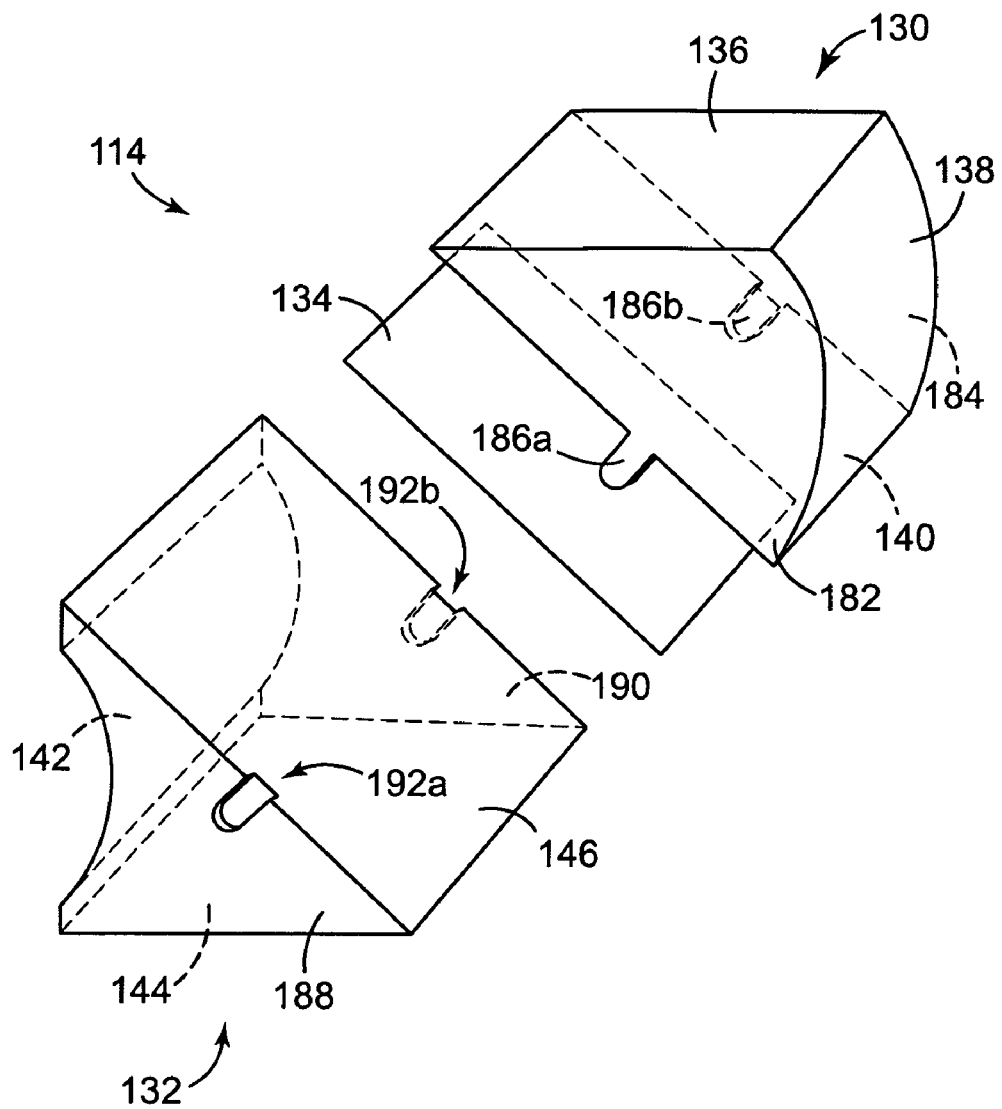
FIGS. 5A–5D are exploded perspective views of additional exemplary embodiments of the reflective PBS according to the present disclosure, having general configurations similar to the PBS of FIG. 1.

As shown in FIG. 5A, first prism 130 of PBS 114 further includes left surface 182, right surface 184, and projections, such one or more male members 186a and 186b. Left surface 182 and right surface 184 are the lateral surfaces of first prism 130, and are spaced apart by an outer surface 136, a curved outer surface 138, and an incident surface 140. Male members 186a and 186b can extend respectively from left surface 182 and right surface 184 at the peripheral edges of incident surface 140, in a direction beyond incident surface 140. First prism 130 may be molded with the one or more male members 186a and 186b integrally formed with left surface 182 and/or right surface 184.

Second prism 132 includes a left surface 188 and a right surface 190. Left surface 188 and right surface 190 are the lateral surfaces of the second prism 132 and are spaced apart by a curved outer surface 142, an outer surface 144, and an incident surface 146. One or more female portions 192a and 192b, each capable of receiving one of the at least one male members 186a and 186b therein, can extend respectively within left surface 188 and right surface 190, and extend up to the peripheral edges of incident surface 146. The one or more female portions 192a and 192b may be formed during the molding of the second prism 132, or subsequently cut out of left surface 188 and/or right surface 190.

While PBS 114 is shown with male members 186a and 186b extending from the first prism 130 and with the female portions 192a and 192b disposed in the second prism 132, an opposite orientation may alternatively be used. In this alternative design, male members 186a and 186b extend from the second prism 132 and female portions 192a and 192b are disposed in the first prism 130. In another alterative design, first prism 130 may include a first male member and a first female portion that correspond to a second male member and a second female portion of second prism 132.

Figure 5B:
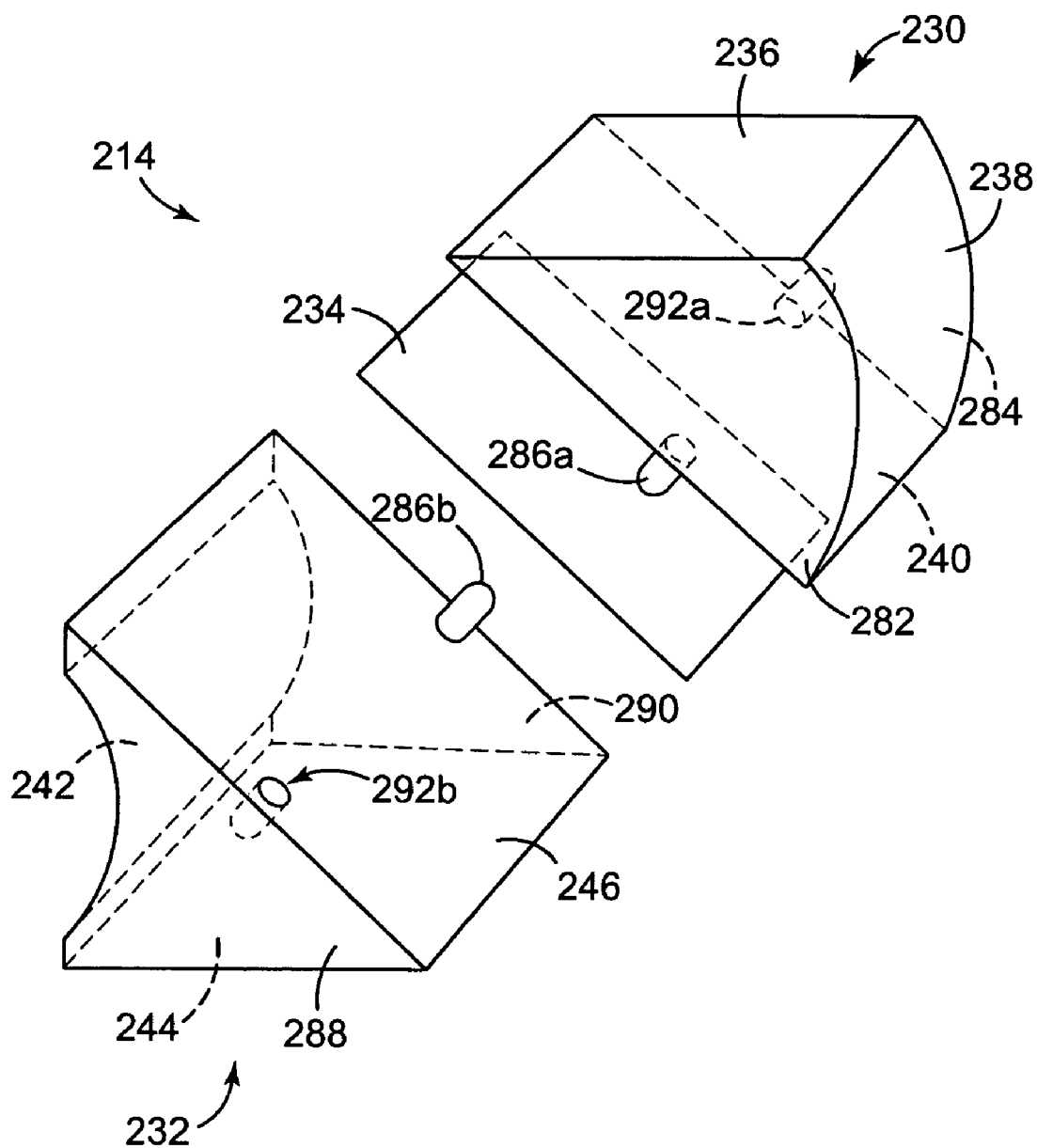

FIG. 5B depicts PBS 214, which is similar to PBS 114 and includes first prism 230 and second prism 232, where first prism 230 includes male member 286a and female portion 292a, and second prism 232 includes male member 286b and female portion 292b. Male members 286a and 286b are pegs respectively disposed on incident surfaces 240 and 246 (i.e., the surfaces adjacent to the reflective polarizing film), and project therefrom. Similarly, female portions 292a and 292b are depressions respectively disposed in incident surfaces 240 and 246.

Figure 5C:
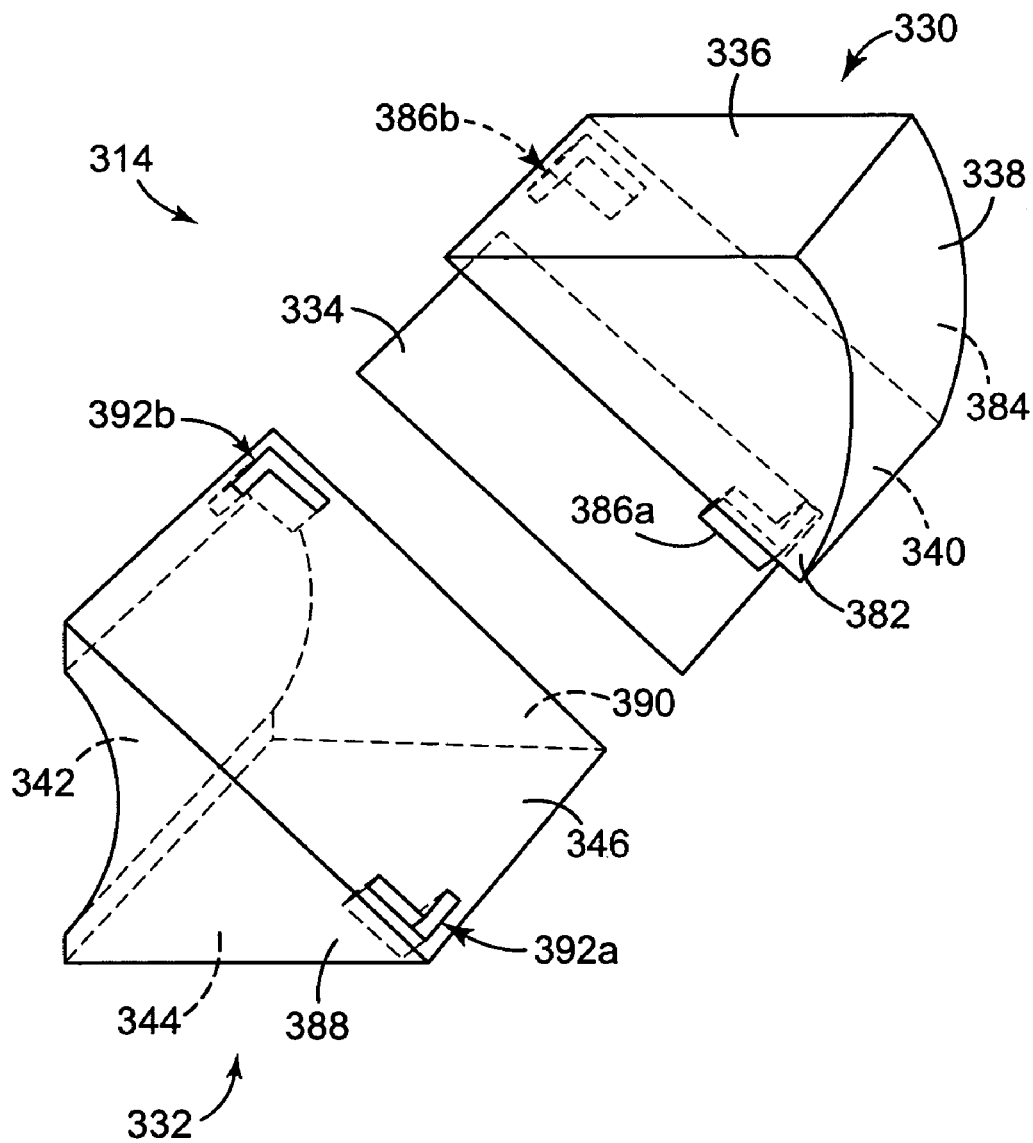

FIG. 5C depicts PBS 314, which is also similar to PBS 114 and includes first prism 330 and second prism 332, where first prism 330 includes male members 386a and 386b, and second prism 332 includes female portions 392a and 392b. Male members 386a and 386b are "L"-shaped members disposed on incident surface 340, and project therefrom. Similarly, female portions 392a and 392b are "L"-shaped members disposed in incident surface 346, and are configured as depressions or slots formed therein.

Figure 5D:
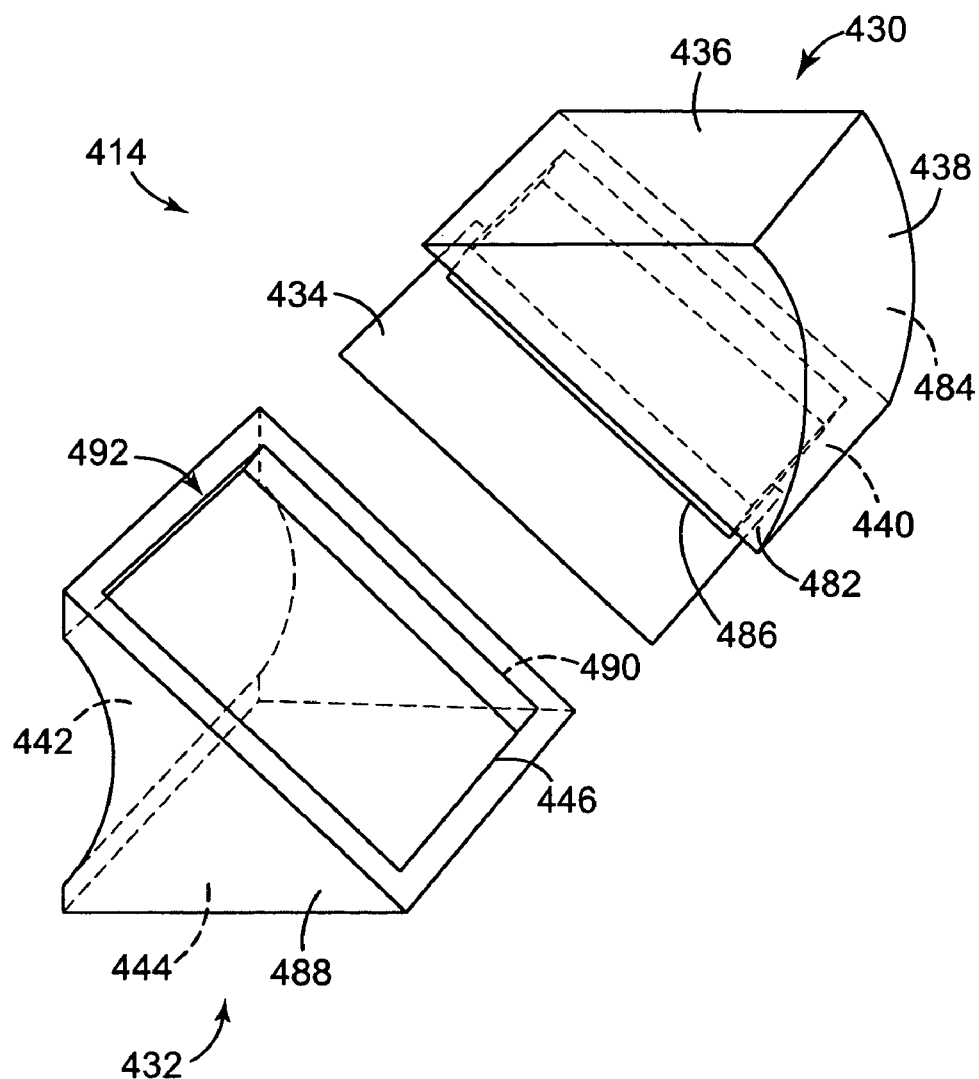

FIG. 5D depicts PBS 414, which is also similar to PBS 114 and includes first prism 430 and second prism 432, where first prism 430 includes male member 486, and second prism 432 includes female portion 492. Male member 486 is a rectangular surface that encompasses the majority of incident surface 440, and which projects therefrom. Similarly, female portion 492 is a rectangular depression that is disposed within the majority of incident surface 446. Reflective polarizing film 434 may then be disposed between male member 486 and female portion 492 when first prism 430 is secured to second prism 432.

During the manufacturing of each of PBSs 114, 214, 314, and 414, the reflective polarizing film may be placed between the first prism and the second prism. The first prism may then be oriented relative to the second prism such that the male member (e.g., male members 186a and 186b) are aligned with the corresponding female portions (e.g., female portions 192a and 192b). This alignment is beneficial for ensuring that the first prism is accurately positioned relative to the second prism. The first prism may then engage second prism by concurrently inserting male members into the corresponding female portions. This compresses the reflective polarizing film between the incident surfaces of the first prism and the second prism to provide a smooth, planar interface. The male members may be secured to the corresponding female portions with an adhesive. Additionally, the first prism may be secured to the second prism by fitting and/or welding the male members to the corresponding female portions (e.g., ultrasonic, infrared, heat staking, snap fits, press fits, and chemical welding).

The male members and female portions illustrated in FIGS. 5A–5D may be substituted with other engagement mechanisms such that one prism includes at least one male member that is configured to engage with a respective female portion located in the opposing prism. As discussed above, while the male members and female portions are shown in use with PBS 114, the alternative engagement mechanisms are suitable for any PBS of the present disclosure (e.g., PBSs 48, 54, and 76). Those of ordinary skill in the art will also readily appreciate that different numbers of the male members and the female portions than those exemplified herein may be used in accordance with the present disclosure. For example, an exemplary PBS may include three or more male members received within three or more female portions.

Although the present invention has been described with reference to exemplary embodiments, workers skilled in the art will recognize that changes may be made in form and detail without departing from the spirit and scope of the disclosure.

What is claimed is:

1. A polarizing beam splitter comprising:
   a first prism comprising a first polymeric material, the first prism having a first outer curved surface and an additional outer surface;
   a second prism comprising a second polymeric material, the second prism having a second outer curved surface; and
   a reflective polarizing film disposed between the first prism and the second prism;
   wherein the first prism is configured to transmit light through at least the first outer curved surface and the additional outer surface.

2. The polarizing beam splitter of claim 1, wherein the first curved surface of the first prism and the second curved surface of the second prism face opposite directions.

3. The polarizing beam splitter of claim 1, wherein the first curved surface of the first prism and the second curved surface of the second prism each have a geometry selected from the group consisting of a convex surface and a concave surface.

4. The polarizing beam splitter of claim 1, wherein the reflective polarizing film comprises a first polymeric material and a second polymeric material different from the first polymeric material.

5. The polarizing beam splitter of claim 1, wherein the additional outer surface of the first prism is a curved surface having a geometry selected from the group consisting of a convex surface and a concave surface.

6. The polarizing beam splitter of claim 1, wherein the first prism comprises at least one male member disposed on a surface adjacent to the reflective polarizing film and projecting therefrom, and wherein the second prism comprises at least one female portion capable of receiving the at least one male member therein.

7. The polarizing beam splitter of claim 1, wherein the first prism is an input prism.

8. The polarizing beam splitter of claim 1, wherein at least one of the first polymer and the second polymer is selected from the group consisting of acrylic polymers, cyclic-olefin copolymers, polycarbonates, and combinations thereof.

9. The polarizing beam splitter of claim 1, wherein the first polymeric material is the same as the second polymeric material.

10. A polarizing beam splitter comprising:
a first prism comprising a first polymeric material, the first prism having a first outer curved surface, a second outer curved surface, and a first incident surface;
a second prism comprising a second polymeric material, the second prism having a third outer curved surface and a second incident surface; and
a reflective polarizing film disposed between the first incident surface and the second incident surface;
wherein the first prism is configured to transmit light through at least the first outer curved surface and the second outer curved surface.

11. The polarizing beam splitter of claim 10, wherein the first outer curved surface of the first prism faces a direction opposite of the third outer curved surface of the second prism.

12. The polarizing beam splitter of claim 10, wherein the first outer curved surface of the first prism, the second outer curved surface of the first prism, and the third outer curved surface of the second prism are each selected from the group consisting of a convex surface and a concave surface.

13. The polarizing beam splitter of claim 10, wherein the first prism and the second prism are each configured such that a portion of light received by the second outer curved surface reflects off the reflective polarizing film and exits the first prism through the first outer curved surface, and a portion of light entering the first prism through the first outer curved surface is transmitted through the reflective polarizing film and exits the second prism through the third outer curved surface.

14. The polarizing beam splitter of claim 10, wherein the first prism and the second prism are each configured such that a portion of light received by the third outer curved surface of the second prism is transmitted through the reflective polarizing film and exits the first prism through the first outer curved surface, and a portion of light entering the first prism through the first outer curved surface is reflected off the reflective polarizing film and exits the first prism through the second outer curved surface.

15. The polarizing beam splitter of claim 10, wherein the first polymeric material is the same as the second polymeric material.

16. The polarizing beam splitter of claim 10, wherein the reflective polarizing film comprises a first polymeric layer and a second polymeric layer different from the first polymeric layer.

* * * * *

UNITED STATES PATENT AND TRADEMARK OFFICE
CERTIFICATE OF CORRECTION

PATENT NO. : 7,362,507 B2 Page 1 of 1
APPLICATION NO. : 11/192655
DATED : April 22, 2008
INVENTOR(S) : John E. Duncan It is certified that error appears in the above-identified patent and that said Letters Patent is hereby corrected as shown below:

Column 8,
Line 48, delete "," and insert -- (U.S. Pat. Publ. 2007/0023941), --, therefor.

Signed and Sealed this

Sixteenth Day of September, 2008

JON W. DUDAS
*Director of the United States Patent and Trademark Office*